US009243601B2

(12) United States Patent
Reichow et al.

(10) Patent No.: US 9,243,601 B2
(45) Date of Patent: Jan. 26, 2016

(54) ON-BOARD ELECTRICAL SYSTEM FOR A VEHICLE

(75) Inventors: Dirk Reichow, Wenzenbach (DE); Tobias Steckermeier, Regensburg (DE); Tobias Galli, Roding (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 707 days.

(21) Appl. No.: 13/634,758

(22) PCT Filed: Mar. 10, 2011

(86) PCT No.: PCT/EP2011/053575
§ 371 (c)(1),
(2), (4) Date: Oct. 23, 2012

(87) PCT Pub. No.: WO2011/113734
PCT Pub. Date: Sep. 22, 2011

(65) Prior Publication Data
US 2013/0162029 A1    Jun. 27, 2013

(30) Foreign Application Priority Data

Mar. 13, 2010   (DE) .......................... 10 2010 011 276

(51) Int. Cl.
*B60L 1/00* (2006.01)
*B60L 3/00* (2006.01)
*H02G 3/00* (2006.01)
(Continued)

(52) U.S. Cl.
CPC ............... *F02N 11/0866* (2013.01); *B60L 1/00* (2013.01); *H02J 7/1423* (2013.01); *B60R 16/03* (2013.01); *F02N 11/087* (2013.01); *F02N 2011/0885* (2013.01); *F02N 2200/063* (2013.01)

(58) Field of Classification Search
CPC .......... B60L 1/00; H02J 7/1423; B60R 16/03; F02N 11/0866; F02N 2200/063; F02N 2011/0885; F02N 11/087
USPC .................. 307/10.1, 10.7, 9.1, 127; 320/165
See application file for complete search history.

(56) References Cited

U.S. PATENT DOCUMENTS 5,525,891 A * 6/1996 Meyer et al. .................. 320/128
5,977,744 A   11/1999 Williams et al.
(Continued)

FOREIGN PATENT DOCUMENTS

DE   39 30 091 A1   3/1991
DE   41 38 943 C1   5/1993
(Continued)

*Primary Examiner* — Rexford Barnie
*Assistant Examiner* — Rasem Mourad
(74) *Attorney, Agent, or Firm* — Laurence Greenberg; Werner Stemer; Ralph Locher

(57) ABSTRACT

An on-board electrical system for a motor vehicle contains a first energy storage unit with a first voltage level and a second energy storage unit with a second voltage level. A control unit controls a flow of current between the first energy storage unit and the second energy storage unit in both directions. A polarity-reversal protection diode connects the first energy storage unit for supplying operating voltage to the control unit. A switching element bridges the polarity-reversal protection diode when the polarity of the first energy storage unit is correct. The first voltage level is compared with the second voltage level by a comparator and the switching element is moved to its open state when the first voltage level drops to a threshold voltage value which is below the second voltage level.

11 Claims, 1 Drawing Sheet

(51) Int. Cl.
*F02N 11/08* (2006.01)
*H02J 7/14* (2006.01)
*B60R 16/03* (2006.01)

(56) References Cited

U.S. PATENT DOCUMENTS

| | | | | |
|---|---|---|---|---|
| 6,922,322 | B2* | 7/2005 | Strayer | H02H 11/003 361/111 |
| 7,369,383 | B2 | 5/2008 | Allmeier et al. | |
| 7,924,540 | B2* | 4/2011 | Tamegai | 361/91.5 |
| 8,344,541 | B1* | 1/2013 | Li | B60R 16/0232 307/10.1 |
| 2003/0155814 | A1* | 8/2003 | Gronbach | B60L 11/1868 307/130 |
| 2004/0112320 | A1* | 6/2004 | Bolz | F02N 11/04 123/179.28 |
| 2004/0124709 | A1* | 7/2004 | Eisenberger et al. | 307/29 |
| 2004/0130298 | A1* | 7/2004 | Krieger | H02J 7/0034 320/165 |
| 2005/0275289 | A1* | 12/2005 | Jabaji | B60L 1/00 307/10.1 |
| 2010/0001581 | A1* | 1/2010 | Broesse | B60R 16/03 307/9.1 |
| 2011/0012424 | A1 | 1/2011 | Wortberg et al. | |

FOREIGN PATENT DOCUMENTS

| | | |
|---|---|---|
| DE | 100 01 485 A1 | 7/2001 |
| DE | 100 03 731 A1 | 8/2001 |
| DE | 102 22 149 A1 | 12/2003 |
| DE | 697 27 441 T2 | 12/2004 |
| DE | 10 2005 015 993 A1 | 10/2006 |
| DE | 10 2005 031 478 A1 | 1/2007 |
| DE | 10 2007 027 498 A1 | 1/2008 |
| DE | 10 2006 036 425 A1 | 2/2008 |
| DE | 10 2007 062 955 A1 | 7/2009 |
| WO | 2009/012843 A1 | 1/2009 |

* cited by examiner

ON-BOARD ELECTRICAL SYSTEM FOR A VEHICLE

BACKGROUND OF THE INVENTION

Field of the Invention

The invention relates to an on-board electrical system for a vehicle, in particular a motor vehicle, according to the preamble as claimed.

On-board electrical systems in modern motor vehicles comprise a generator in the form of a three-phase machine with a downstream rectifier circuit as energy converter, one or more energy storage units or batteries, and electrical loads which are intended to be supplied via the on-board electrical system. In such on-board electrical systems, polarity-reversal protection is implemented by means of the rectifier diodes of a downstream rectifier circuit.

In addition, on-board electrical systems are also known which comprise two energy storage systems with different nominal voltages as system voltages without potential isolation, for instance one energy storage system, for example a 12 V battery, for normal loads of the motor vehicle, and a further energy storage system, for example consisting of double-layer capacitors (ultracapacitors), for high-current loads.

Battery management for energy-flow and quiescent-current management between these two energy storage systems is effected by means of a control unit or a control device, wherein this control unit is supplied with an operating voltage by the 12 V battery. A valve is used for polarity-reversal protection, for example a polarity-reversal protection diode, which connects the 12 V battery to the control unit.

One disadvantage of such an on-board electrical system comprising two energy storage systems is a state in which the system voltage of the 12 V battery falls below the voltage of the further energy storage unit and thus there is a risk of charge flowing away in the direction of the 12 V battery due to parasitic effects in semiconductor components of the control unit.

BRIEF SUMMARY OF THE INVENTION

The problem addressed by the invention is therefore to provide an on-board electrical system for a vehicle in which such flowing-away of charge is prevented.

This problem is solved by an on-board electrical system having the features as claimed.

Accordingly, in an on-board electrical system for a vehicle, in particular a motor vehicle, which comprises
  a first energy storage unit having a first voltage level,
  a second energy storage unit having a second voltage level,
  a control unit, which controls the flow of current between the first energy storage unit and the second energy storage unit in both directions if the second voltage level is lower than the first voltage level,
  a polarity-reversal protection diode, which connects the first energy storage unit to the control unit for the purpose of supplying operating voltage, and
  a switching element for bridging the polarity-reversal protection diode when the polarity of the first energy storage unit is correct,
it is provided according to the invention that the first voltage level is compared with the second voltage level by means of a comparison circuit, in particular a comparator, and
  when the first voltage level falls to a voltage threshold value lying below the second voltage level, the controllable switch is controlled into the open state thereof, by means of control means, preferably of the comparator.

The polarity-reversal protection for the control unit and for preventing an undesired interchange of charge between the two energy storage units is thus obtained in a simple and surprising manner. In particular, no additional power components are necessary. Furthermore, according to one development of the invention, easy adjustability of the voltage threshold value is possible by means of the proposed comparator.

Further advantageous embodiments of the invention are given in the features of the dependent patent claims.

BRIEF DESCRIPTION OF THE SEVERAL VIEWS OF THE DRAWING

The invention will be explained in more detail in the following text with reference to the attached figures, in which.

DESCRIPTION OF THE INVENTION

Figure 1:
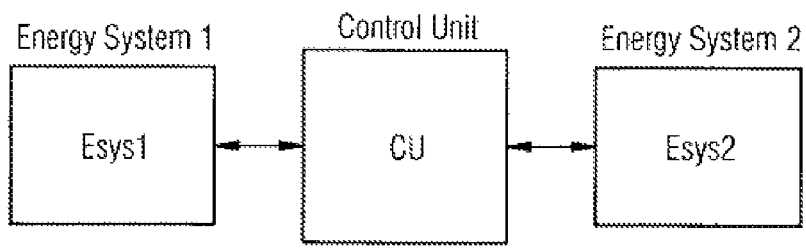
FIG. 1 shows a schematic block diagram of an exemplary embodiment of the on-board electrical system for a motor vehicle, according to the invention.

FIG. 1 shows an on-board electrical system consisting of a first energy storage unit Esys1 having a nominal voltage $V_{SYS1}$, in this case a 12 V battery, and a second energy storage unit Esys2 having a nominal voltage $V_{SYS2}$, which may likewise be a battery, or a double-layer capacitor or another storage medium.

The nominal voltage $V_{SYS1}$ of the first energy storage unit Esys1, that is to say the system voltage thereof, is higher than the nominal voltage $V_{SYS2}$ or system voltage of the second energy storage unit Esys2: $V_{SYS1} > V_{SYS2}$.

A control unit CU connects the two energy storage units Esys1 and Esys2, which are not potential-isolated, and controls the energy interchange in the sense of an energy management system between these two energy storage units Esys1 and Esys2, that is to say that, in the nominal state of the two system voltages, an energy interchange is possible both from the first energy storage unit Esys1 in the direction of the second energy storage unit Esys2 and conversely from the second energy storage unit Esys2 in the direction of the first energy storage unit Esys1.

Figure 2:
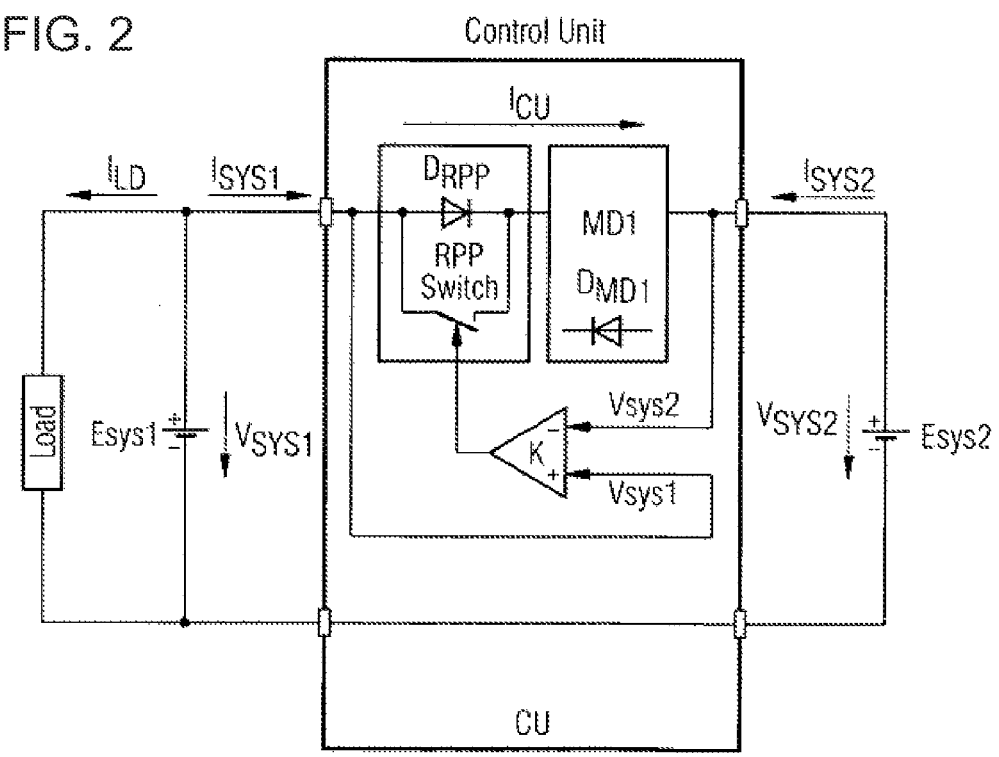
FIG. 2 shows a detailed block diagram of the on-board electrical system in accordance with FIG. 1.

In accordance with the detailed illustration of FIG. 2, electrical loads of the motor vehicle, which are illustrated as system load Load and are supplied by a load current $I_{LD}$, are connected to the first energy storage unit Esys1. The energy interchange, managed by the control unit CU, between the two energy storage units Esys1 and Esys2 takes place by means of the system currents $I_{SYS1}$ and $I_{SYS2}$. In this exemplary embodiment, the two energy storage systems Esys1 and Esys2 are not potential-isolated.

The first energy storage unit Esys1 also supplies the operating voltage supply for the control unit CU, the associated load current is designated $I_{CU}$, wherein, between the first energy storage unit Esys1 and the control unit CU, a polarity-reversal protection circuit RPP (reverse polarity protection) is connected, which for example consists of a polarity-reversal protection diode $D_{RPP}$ and can be shorted by a controllable switch Switch, for example a transistor or a mechanical switch, such as a relay.

This switch Switch is actuated by a comparison circuit, in this case a comparator K. For this purpose, the voltage $V_{SYS1}$ of the first energy storage unit Esys1 is fed to the non-inverting input of the comparator K and the voltage Esys2 of the second energy storage unit Esys2 is fed to the inverting input of the comparator K.

If both system voltages $V_{SYS1}$ and $V_{SYS2}$ are at the nominal value thereof, that is to say if $V_{SYS1} > V_{SYS2}$, then the switch Switch is closed by means of corresponding control of the comparator K, that is to say the transistor is controlled into the conducting state thereof with the result that the polarity-reversal protection diode $D_{RPP}$ is bridged.

If, due to great discharging, the voltage $V_{SYS1}$ of the first energy storage unit Esys1, for instance a 12 V battery, falls to a voltage threshold value $V_{sch}$ which lies below the voltage value of the voltage $V_{SYS2}$ of the second energy storage unit Esys2, that is to say when $V_{SYS1} \leq V_{sch} < V_{SYS2}$, the switch Switch is controlled into the open state thereof by the comparator K with the result that, due to the polarity-reversal protection diode $D_{RPP}$, charge is prevented from flowing away from the second energy storage unit Esys2 in the direction of the first energy storage unit Esys1.

Such flowing-away of the charge could occur because of parasitic semiconductor elements in the control unit CU, which are representatively illustrated in FIG. 2 by a diode $D_{MD1}$. Such a parasitic semiconductor component can for example also arise in a DC/DC converter MD1 actuated by the control unit CU, for example as bulk diode or body diode of a high-side transistor.

The voltage threshold value $V_{sch}$ is adjustable by means of the control unit CU.

If the first energy storage unit Esys1 is connected to the control unit CU with incorrect polarity, the voltage $V_{SYS1}$ of the energy storage unit Esys1 is: $V_{SYS1} < 0$. In this state, too, the comparator K1 would open the switch Switch, that is to say control the transistor into the off state thereof, with the result that the polarity-reversal protection diode $D_{RPP}$ becomes active.

The comparator K can be designed with a time-delayed response, in that it is for example connected to a timer component. In this way, the switch Switch is both closed and opened by means of the comparator K in a time-delayed manner.

The exemplary embodiment explained above shows an on-board electrical system according to the invention without potential isolation between the two energy storage systems Esys1 and Esys2. Of course, the invention is not restricted thereto, rather it can likewise be used for systems with potential isolation.

The invention claimed is:

1. An on-board electrical system for a vehicle, comprising:
    a first energy storage unit outputting a first voltage level;
    a second energy storage unit outputting a second voltage level;
    a control unit controlling a flow of current between said first energy storage unit and said second energy storage unit in both directions;
    a polarity-reversal protection diode connecting said first energy storage unit to said control unit for supplying an operating voltage;
    a switching element connected in parallel with said polarity-reversal protection diode; and
    a comparison unit configured for comparing the first voltage level with the second voltage level, said comparison unit configured to close said switching element to short said polarity-reversal protection diode when the comparing determines that the first voltage level is above the second voltage level, and said comparison unit configured to open said switching element so that said polarity-reversal protection diode is not shorted by said switching element when the comparing determines that the first voltage level has fallen to a voltage threshold value lying below the second voltage level.

2. The on-board electrical system according to claim 1, wherein the voltage threshold value is adjustable.

3. The on-board electrical system according to claim 1, wherein said comparison unit is a comparator having a time-delayed response characteristic.

4. The on-board electrical system according to claim 1, wherein said switching element is a semiconductor switch.

5. The on-board electrical system according to claim 1, wherein the on-board electrical system is configured without potential isolation with respect to said first and second energy storage units.

6. The on-board electrical system according to claim 1, wherein the on-board electrical system is configured with potential isolation with respect to said first and second energy storage units.

7. The on-board electrical system according to claim 1, wherein said first energy storage unit is used as an operating voltage source for a load circuit having electrical loads.

8. The on-board electrical system according to claim 1, wherein the first and second voltage levels are in each case a nominal voltage of said first and second energy storage units respectively.

9. The on-board electrical system according to claim 1, wherein said control unit manages a battery.

10. The on-board electrical system according to claim 1, wherein:
    said comparison unit is a comparator; and
    the vehicle is a motor vehicle.

11. The on-board electrical system according to claim 4, wherein said semiconductor switch is selected from the group consisting of a transistor and an electromechanical switch.

* * * * *